UNITED STATES PATENT OFFICE.

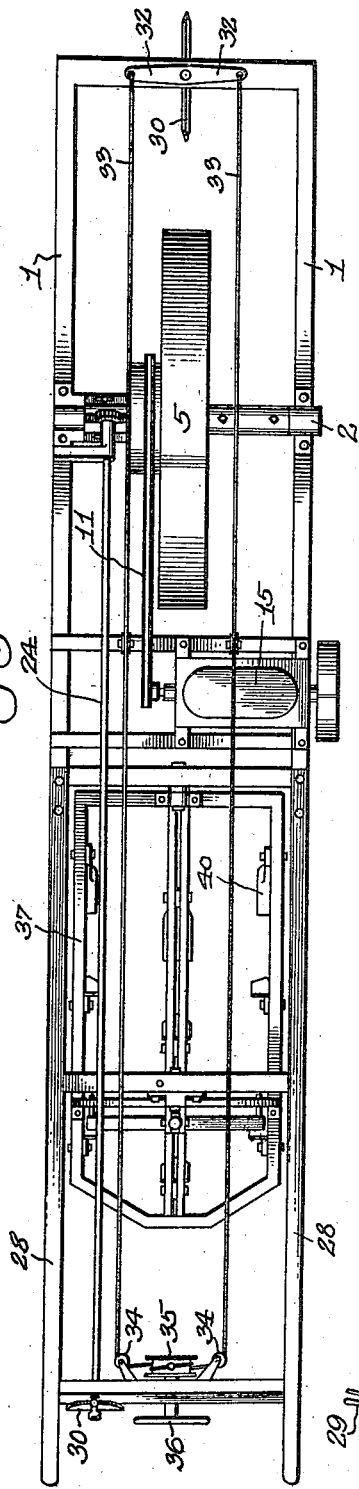

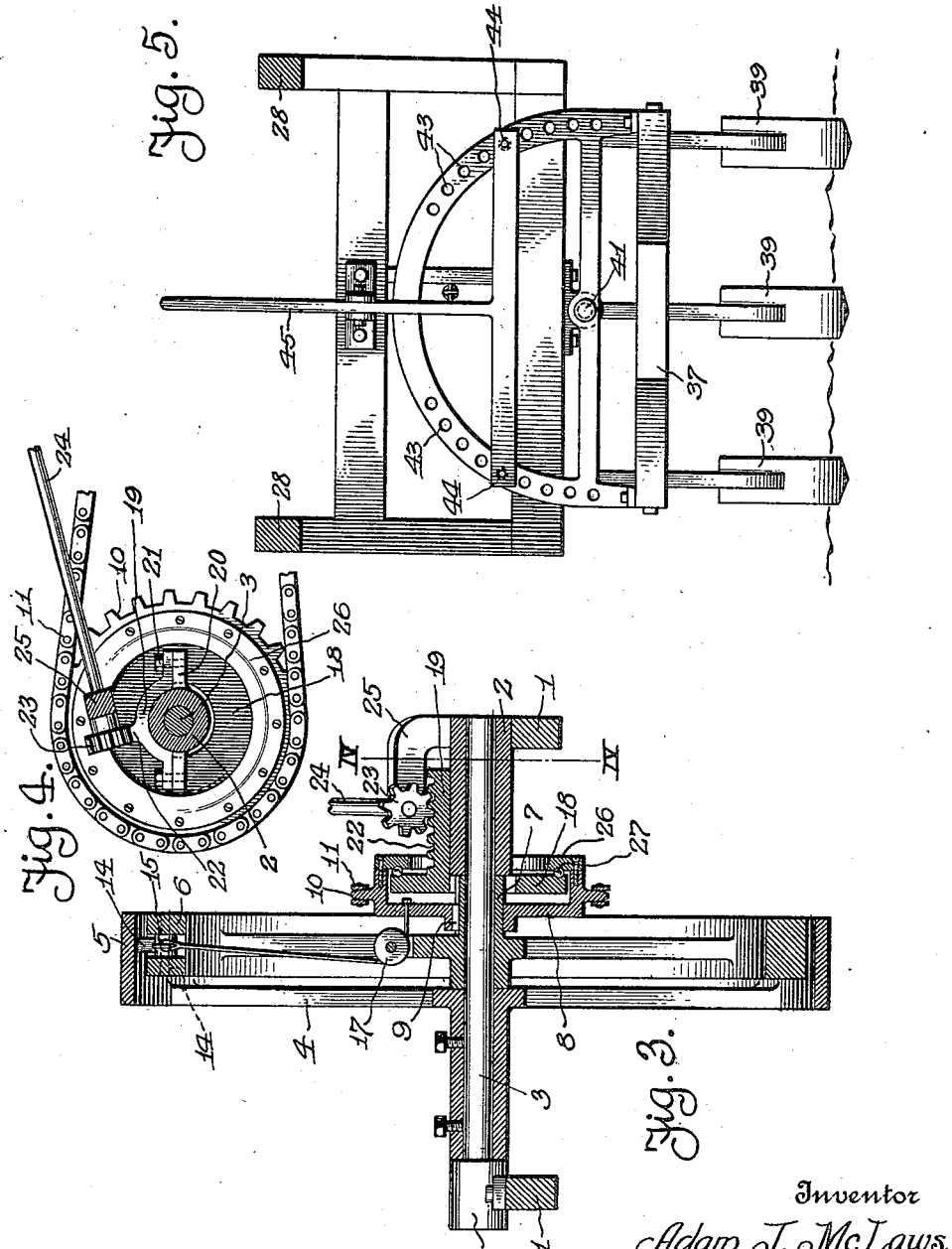

ADAM J. McLAWS, OF DETROIT, MICHIGAN.

TRACTOR.

1,410,488.  Specification of Letters Patent.  Patented Mar. 21, 1922.

Application filed February 27, 1920. Serial No. 361,769.

*To all whom it may concern:*

Be it known that I, ADAM J. McLAWS, a citizen of the United States of America, residing at Detroit, in the county of Wayne and State of Michigan, have invented certain new and useful Improvements in Tractors, of which the following is a specification, reference being had therein to the accompanying drawings.

This invention relates to a motor driven plow or cultivator of the type in which the cultivator is drawn by the tractor and is guided by means of handles adapted to be grasped by the operator.

An object of the invention is to provide a very simple motor driven tractor particularly adapted for hand plows and the like and further to provide such a tractor with clutch mechanism whereby the impetus of a rotating member or fly wheel may be imparted to the traction wheel for the purpose of increasing momentarily the power of the engine to drive the traction wheel. A further object is to provide a motor driven farm implement which may be easily controlled and handled and turned within a short space, the arrangement being such as to provide for the use of a single motor driven traction wheel. Another object of the invention is to provide means whereby the single traction wheel may be maintained in an upright position regardless of the inclination of the ground, and certain other new and useful features are provided, all as will hereinafter more fully appear.

With the above and other ends in view, the invention consists in the matters hereinafter set forth and more particularly pointed out in the appended claims, reference being had to the accompanying drawings in which—

Fig. 1 is a side elevation of an implement embodying the invention;

Fig. 2 a plan view of the same;

Fig. 3 an enlarged transverse vertical section through the traction wheel longitudinally of its axle;

Fig. 4 is a sectional detail substantially upon the line IV—IV of Fig. 3; and

Fig. 5 is an enlarged rear end elevation of the frame showing the handles in section.

As shown in the drawings, 1 indicates a main supporting frame which is preferably rectangular in construction and may be made of longitudinal and transverse bars of wood or other suitable material. This frame, at a distance rearwardly from its forward end is provided with bearings 2 for a transverse shaft or axle 3 to which is secured in any suitable manner a traction or ground wheel 4. The rim 5 of the traction wheel is connected to the hub portion by spokes which are located adjacent one edge of the rim and within the vertical plane of the rim 5 is located an inner wheel 6 having a heavy rim to provide weight so that this inner wheel will act as a fly wheel when in motion. The fly wheel 6 is also mounted upon the shaft 3 but turns freely thereon and has an extended hub portion 7 upon which is mounted a drum 8 connected to the hub in any suitable manner as by a key 9 to turn with the hub. This drum is provided with external teeth forming a sprocket wheel 10 adapted to be engaged by a sprocket chain 11 extending rearwardly to the crank shaft of a suitable motor 12 upon whose crank shaft is mounted a sprocket wheel which is engaged by the chain 11. The motor 12 is mounted with its shaft extending transversely of the frame 1 and located just rearwardly of the traction wheel 4. Motion is transmitted by the chain 11 from the motor through the drum 8 to the fly wheel 6 and to connect the fly wheel with the traction wheel 4 for the purpose of transmitting motion to the traction wheel, suitable clutch members 13 are located within recesses of the rim of the fly wheel and pivotally attached to the rim as at 14 to turn on their pivots and engage at one end the inner surface of the rim 5 of the traction wheel. Each friction member 13 is provided with an arm 15 extending laterally from its pivot and to the free ends of these arms are attached cables 16 extending radially inward of the fly wheel and passing over pulleys 17 carried thereby adjacent the hub of the wheel. From the pulleys 17 the cables 16 extend outwardly and are made fast to the drum 8. Within the drum 8 is a disk 18 carried by a flange 19 formed integral therewith and extending longitudinally of the shaft 3. This flange 19 is formed to fit over one of the bearings 2 on which the shaft 3 turns and to rest upon suitable lugs or flanges 20 extending laterally from the sides of the bearing. Bolts 21 passing through longitudinal slots in the flange 19 secure it in place upon the lugs 20 and permit of free longitudinal movement of the flange 19 thereon.

A rack is formed by providing teeth 22 upon the upper side of the flange 19 and a pinion 23 is provided upon the end of a shaft 24 in engagement with the rack, said shaft with its pinion being carried in a suitable bearing block 25 on the frame.

The drum 8 is provided with an end ring 26 detachably secured to the outer side of the drum and opposing the outer face of the disk 18 and interposed between said disk and ring are anti-friction balls 27. The shaft 24 is extended rearwardly to a point adjacent the hand grip rear ends of the handles 28 which are secured in the usual manner to the rear end portion of the frame 1. The rear end of the shaft 24 is provided with a control lever 29 by means of which the shaft may be conveniently turned by the operator, a suitable segment 30 being provided adjacent the control lever to hold said lever in any position to which it may be adjusted.

By adjusting the control lever 29 the shaft 24 is turned, thereby turning the gear 23 and moving the rack flange 19 longitudinally. This longitudinal movement of the rack flange carries with it the disk 18, thereby retaining the anti-friction bearing in place, which disk in turn moves the drum 8 longitudinally upon the hub of the fly wheel, thereby exerting a pull upon all of the members 16 simultaneously and turning the several friction members 13 outwardly into frictional engagement with the rim of the traction wheel. When this strain upon the cables 16 is released by an opposite turning movement of the shaft, the drum will be moved toward the wheel by such strain sufficiently to relieve the frictional pressure of the clutch members against the rim. Motion may therefore be imparted to the traction wheel from the fly wheel 6 as desired and when said fly wheel is in rapid rotation, a sudden bringing of the friction members into contact with the traction wheel rim will impart to the traction wheel the power of inertia of the fly wheel and thus momentarily increase the power of the engine to drive the traction wheel so that as occasion may require, as when the forward movement of the implement meets some increased resistance, this sudden impetus may be imparted to the traction wheel.

The steering of the implement, which ordinarily would be guided by the operator grasping the handles 28, is assisted by means of a guide disk 30 carried by a vertical post 31 rotatively mounted in a suitable bearing at the forward end of the frame 1 directly in the path of the traction wheel 4. This disk 30 has a sharp cutting edge so that it will cut into the ground and thus have a firm hold thereon and the upper end of the post 31 is provided with laterally extending arms 32 to the outer ends of which cables 33 are attached, said cables extending rearwardly to a point adjacent the rear ends of the handles 28 where they are passed over pulleys 34 and made fast at their ends to a disk 35, said cable being wrapped around the drum in opposite directions so that when the drum is turned by means of a hand wheel 36 one cable will unwrap from the drum and the other be wrapped around the same, thus exerting a pull upon one cable to turn the post 31 and change the direction of travel of the disk 30.

By reason of the firm engagement of the disk 30 with the ground, it will exert a force to turn and direct the implement and this turning movement may be assisted by the operator by lifting upon the handles 28 and raising the rear end of the machine. The implement may therefore be readily steered and turned within a short space.

Pivotally attached to the frame 1 rearwardly of the traction wheel and engine, is a plow frame 37, said frame being located below the main frame 1 and attached thereto at its forward end by means of a pivot connection 38, the axis of which extends longitudinally of the frame so that said frames 1 and 37 may tilt relatively in a transverse direction. The frame 37 carries the several plows or shovels 39 and also depth gauges or members 40 having flat surfaces to engage the surface of the ground and ride thereon limiting the depth to which the shovels 39 will enter the ground. These members 40 also serve as supports for the rear end of the frame 1. The shovel frame 37 is connected to the rear end of the frame 1 by means of a pivot 41 at the central longitudinal axis of the frame and a circle frame 42 is attached to the plow frame 37 at each side thereof extending upwardly therefrom adjacent the end of the frame 1. This circle frame 42 is provided with a series of openings 43 adapted to be engaged by pins 44 on the ends of a locking lever 45 which is pivotally secured to the frame 1. The frames 1 and 37 may therefore be locked relatively in a lateral direction and then held in their relative adjusted position by engaging the pins of the lever 35 in the openings 43 of the circle frame.

This locking connection between the frames 1 and 37 is provided so that when the implement is being used upon a side hill, the frame 1 may be tilted laterally to set the traction wheel 4 in an upright position and will be held in such position by means of the plow frame 37 which is supported directly upon the surface of the ground. The upsetting of the machine or the lateral overturning of the tractor wheel is therefore prevented by the plow frame without the necessity for the operator holding the tractor wheel in an upright position by means of the handles 28.

Obviously, changes may be made in the construction and arrangement of parts within the scope of the appended claims without departing from the spirit of the invention, and I do not, therefore, limit myself to the particular construction shown.

Having thus fully described my invention, what I claim is:—

1. In a machine of the character described, the combination of a main frame, a motor carried by the main frame, a traction wheel supporting the frame, a fly wheel within the traction wheel, means for imparting motion from the engine to the fly wheel, and means for frictionally connecting the fly wheel and rim of the traction wheel, whereby the inertia of the fly wheel may be imparted directly to the traction wheel.

2. In a machine of the character described, the combination of a traction wheel, a fly wheel rotatable upon an axis coincident with the axis of the traction wheel and independently thereof, means for imparting motion to the fly wheel and frictional means for imparting motion from the fly wheel to the traction wheel rim.

3. In a machine of the character described, the combination of a traction wheel, a fly wheel rotatable upon an axis coincident with the axis of the traction wheel independently thereof and within the vertical plane of the rim of the traction wheel, means for imparting motion to the fly wheel, and means carried by the fly wheel for frictionally engaging the rim of the traction wheel to impart motion thereto.

4. In a machine of the character described, the combination of a traction wheel, a fly wheel within the traction wheel rotatable independently thereof, means carried by the fly wheel for frictionally engaging the traction wheel rim to impart motion thereto from the fly wheel, means carried by the fly wheel for operating said friction means, and means for imparting motion to the fly wheel.

5. In a machine of the character described, the combination of a main frame, a single traction member supporting the main frame, a fly wheel within the vertical plane of the rim of the traction wheel and rotatable independently thereof, friction members carried by the rim of the fly wheel, means extending radially inward of the fly wheel for operating said friction members, means movable longitudinally of the shaft of the fly wheel for operating said radially extending means, and means for imparting motion to the fly wheel.

6. In a machine of the character described, the combination of a traction wheel, a fly wheel located within the traction wheel and rotatable independently thereof, friction members carried by the rim of the fly wheel adapted to engage the rim of the traction wheel, and means for operating said members.

7. In a machine of the character described, the combination of a main frame, a shaft mounted in bearings on the main frame and extending transversely thereof, a single traction wheel mounted on said shaft, a fly wheel mounted on said shaft to turn independently thereof, friction members carried by the fly wheel to engage the traction wheel, means rotatable with the fly wheel and movable longitudinally of the shaft for operating the friction members, and non-rotatable means slidable longitudinally of the shaft for moving said friction operating means longitudinally of the shaft.

8. In a machine of the character described, the combination of a main frame, a shaft extending transversely thereof and mounted in bearings thereon, a traction wheel mounted on said shaft a fly wheel mounted on said shaft to turn independently thereof and positioned within the vertical plane of the rim of the traction wheel, friction members carried by the fly wheel to engage the inner surface of the rim of the traction wheel, means extending radially inward of the fly wheel for operating the friction members, a drum rotatable with the fly wheel and movable longitudinally of the shaft relatively thereto and to which drum said means for operating the friction members is connected, a fixed member located within the drum and slidable longitudinally of the shaft for moving the drum longitudinally, said member being provided with rack teeth, a pinion to engage the rack teeth, a shaft upon which the pinion is secured, said shaft extending longitudinally of the frame to the rear end thereof, means for turning the shaft and holding the same in adjusted position, a motor mounted on the main frame, and means for transmitting motion from the motor to said drum to turn the fly wheel.

In testimony whereof I affix my signature in the presence of two witnesses.

ADAM J. McLAWS.

Witnesses:
 ANNA M. DORR,
 CHAS. W. STAUFFIGER.